May 12, 1936.    G. E. ROWE    2,040,783
METHOD OF AND APPARATUS FOR MANUFACTURING HOLLOW GLASSWARE
Filed Dec. 15, 1934

Witness:
A. A. Horn

Inventor:
George E. Rowe
by Brown + Parham
Attorneys.

Patented May 12, 1936

2,040,783

UNITED STATES PATENT OFFICE 2,040,783

METHOD OF AND APPARATUS FOR MANUFACTURING HOLLOW GLASSWARE

George E. Rowe, Wethersfield, Conn., assignor to Hartford-Empire Company, Hartford, Conn., a corporation of Delaware Application December 15, 1934, Serial No. 757,595

4 Claims. (Cl. 49—9)

This invention relates generally to the manufacture of hollow articles of glassware, such as bottles and the like, from charges that have been produced by an associate feeder, and more particularly to the manufacture of such charges into the articles desired in such manner and by such means as to obviate so called "settle blow waves" or "counterblow waves" in the walls of the body portions of the articles produced.

In Patent No. 1,945,985, granted Feb. 6, 1934, to the Hartford-Empire Co. as assignee of Arthur Edgar Smith, and in Patent No. 1,945,983, granted to the same company as assignee of the present applicant, there are disclosed methods of and apparatus for manufacturing bottles and other articles of glassware which will be practically free from the objectionable "settle blow waves" or "counterblow waves" above referred to.

According to the disclosures of these patents, an annular portion of a glass charge in an inverted parison mold is displaced upwardly in the mold cavity nearly to the upper end of that cavity by the use of a plunger which is thrust downwardly into the glass in the mold promptly after the delivery of the glass to the mold cavity. Subsequently, the plunger referred to is withdrawn, leaving an axial cavity in the bottom portion of the glass in the inverted parison mold, which cavity persists until it is obliterated by the application of counterblowing air pressure to an internal portion of the glass in the mold. Thereafter, the steps of forming the counterblowing parison into the desired article of hollow glassware may follow any suitable known or preferred practice.

According to the method of the Smith patent, the plunger above referred to serves both to compact glass of the charge in the neck ring or neck finish portion of the inverted parison mold and to displace glass upwardly in an annulus about the plunger at the upper end of the mold cavity. In the method of my aforesaid Patent 1,945,983, air under pressure may be admitted to the upper end of the inverted parison mold in timed relation with the operation of the descending plunger so that the compacting of the glass in the neck portion of the mold may be effected mainly by air pressure, or by air pressure and plunger action jointly, while the upward displacement of the annulus of glass in the upper portion of the inverted mold is effected mainly by the action of the descending plunger.

According to the inventions of the disclosures of both of the aforesaid patents, the descending plunger by which an annulus of glass is displaced upwardly in the upper portion of an inverted parison mold conforms in cross sectional configuration with the mold cavity and is disposed in centered relation to the mold cavity, i. e., with its longitudinal axis coincident with the longitudinal axis of the mold cavity. Consequently, the space between the descending glass displacing plunger and the adjacent walls of the mold cavity has approximately the same width at all points around the plunger and in the same plane. The crest or upper surface of the upwardly displaced annulus of glass thus will be at approximately the same level in the mold cavity when the glass displacing descending stroke of the plunger has been completed.

I have discovered that, in the manufacture of bottles or similar glass articles of greater transverse dimension in one direction than in a direction at right angles thereto, the "settle blow waves" or "counterblow waves" in the walls of such article may be obviated and a better and more uniform distribution of glass throughout the walls of the bottom portion of the article also may be effected by providing for greater resistance to upward displacement of glass in the side portions of the space in which upward displacement of glass is to be effected than in the end portions of such space. When a plunger is used to effect upward displacement of glass substantially in the manner that is disclosed in the aforesaid patents, the desired differential between the resistances to upward displacement of glass in the aforesaid different portions of the space surrounding the plunger in the mold cavity may be effected by employing a glass displacing plunger that is suitably shaped and dimensioned so that the side portions of the space between the plunger and the adjacent walls of the mold cavity will be narrower than the end portions of such space. In other words, the difference between the minor or lesser transverse dimension of such a plunger and the minor transverse dimension of the mold cavity is less than the difference between the major transverse dimension of the plunger and the corresponding transverse dimension of the mold cavity. The ratio of these differences may be predetermined according to different service requirements and/or according to different shapes of bottles or other articles that are to be manufactured.

For further understanding of the invention and of advantages thereof in the manufacture of a typical article of hollow glassware, reference may be had to the accompanying drawing, in which.

Figure 4:
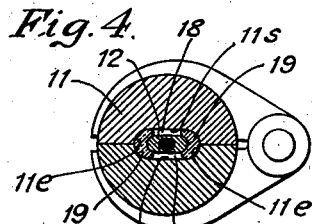
Figure 2:
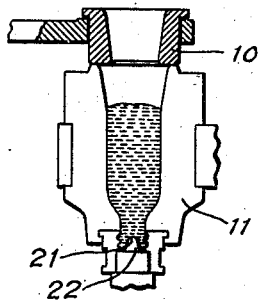
Fig. 2 is a longitudinal vertical section through such mold and through a suitably shaped overlying guide funnel, showing in the mold cavity a charge of glass that has been delivered thereto.
Figure 3:
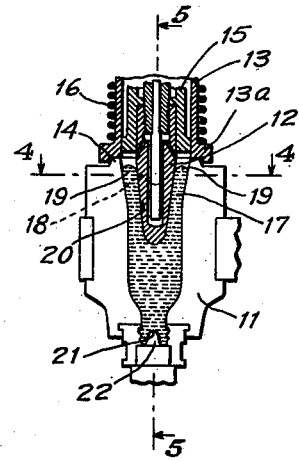
Figure 5:
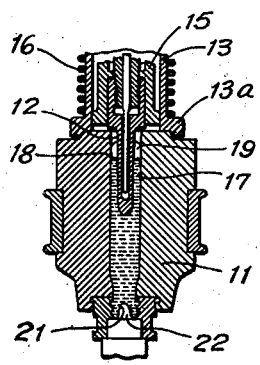
Figure 6:
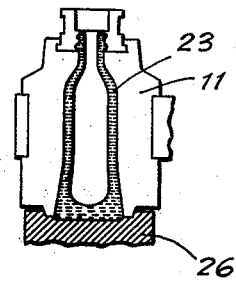
Figure 7:
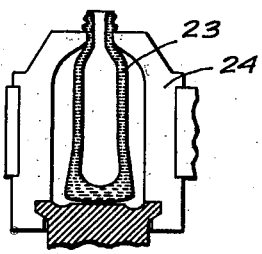
Figure 8:
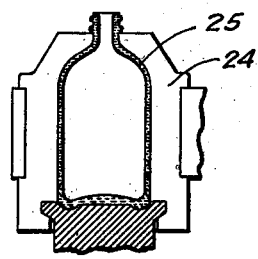
Figure 9:
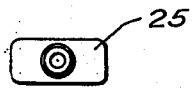

Fig. 3 is a view similar to Fig. 2 but showing the mold after the funnel has been removed and after a glass displacing plunger of the present invention has been thrust downwardly into the glass in the mold, the view also showing a fragmentary portion of suitable operating mechanism for centering the plunger in the mold cavity and for supplying air pressure to the surface of the glass in the mold cavity;

Fig. 4 is a horizontal section through the mold and through the glass and the plunger therein, the view being taken on line 4—4 of Fig. 3;

Fig. 5 is a longitudinal vertical sectional view similar to Fig. 3 but in a plane substantially at right angles therewith, the view being substantially along the line 5—5 of Fig. 3;

Fig. 6 is a vertical sectional view through the parison mold after it has been reverted and after counterblowing of the glass in the mold has been effected;

Fig. 7 is a view showing the counterblown glass parison in a final blow mold, before the glass has been blown to final form;

Fig. 8 is a view similar to Fig. 7 but showing the article that has been produced by the blowing of the counterblown parison to final form in the blow mold; and Fig. 9 is a plan view of the article that has been produced, in this case a bottle having a body of generally oblong cross-sectional configuration.

Figure 1:
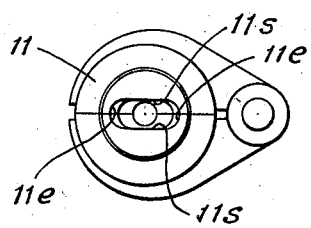
Figure 1 is a plan view of an inverted parison mold having a cavity of a shape appropriate for use in forming a hollow parison that is suitable for subsequent expansion to form a bottle having a body of generally oblong cross-sectional configuration.

In carrying out the method which includes the steps indicated by the views of the accompanying drawing, a charge of glass from any suitable source of supply, as from an associate feeder, not shown, may be delivered through the funnel 10, Fig. 2, to the cavity of the inverted parison mold 11. As shown to advantage in Figs. 1 and 4, the cavity of this mold is of generally oblong shape in cross section, the horizontal distance between the side walls 11—s thereof being substantially less than the distance between the end walls 11—e thereof. A plunger 12 of appropriate shape and dimensions for use in the mold cavity in the performance of the invention, has a shape in cross section generally like that of the cavity of the inverted mold, but is of reduced transverse dimension in the portion thereof that is disposed between the walls 11—e of the mold cavity. In other words, I make or cut away portions of the plunger until its major transverse dimension is less than it would be if it were truly of the same shape in cross section as the mold cavity.

The means for mounting the plunger 12 may be substantially as shown in my aforesaid Patent 1,945,983 and may include a telescopic casing including an outer tubular member 13 having at its lower end a flange 13—a adapted to engage with an upstanding central boss 14 on the inverted parison mold. An internal tubular member 15 carries the stem of the plunger 12 and is slidable in the outer tubular member 13. A spring 16, a fragmentary portion of which is shown, may be interposed between a portion (not shown) of the relatively movable telescopic plunger-carrying member 15 and the flange 13—a of the outer tubular member 13 so that the plunger may remain in its raised position above the glass in the mold cavity until the flanged lower end portion of the outer tubular member 13 has been moved downward into seating engagement with the inverted parison mold and centers the plunger mounting on such mold. Provision may be made for applying air under pressure through the plunger and its mounting to the space above the glass in the mold cavity, for use in conjunction with the plunger movement substantially as disclosed in Patent No. 1,945,983. I have not illustrated and shall not describe herein details of a complete mechanism for mounting and operating the plunger as such a mechanism is fully disclosed in my aforesaid Patent No. 1,945,983, to which reference may be had, or such mechanism may be of any suitable or preferred construction.

As shown in Figs. 3 and 5, the downward movement of the plunger has displaced upwardly an annulus of glass 17 between the immersed portion of the plunger and the adjacent walls of the mold cavity. Because of the greater resistance to upward displacement of glass at the sides of the plunger as compared with the resistance between the ends of the bottom portion of the cavity of the inverted mold and the adjacent portions of the plunger, the upper surface of the annulus of glass will follow a curve which has valleys 18 at the sides of the bottom portion of the mold cavity and crowns or relatively raised portions 19 at the ends of the bottom portion of the cavity of the inverted mold.

When the plunger 12 has been withdrawn from the glass leaving an axial cavity 20 therein, the crowns and valleys at the rim of the annulus of displaced glass will persist. Thereafter, counterblowing pressure is applied to an internal portion of the glass at the opposite end of the mold, as to the aperture 21 that has been provided by the retirement of a neck pin 22.

The cavity 20 will be obliterated as a result of the counterblowing pressure, the glass in the bottom portion of the mold cavity being expanded against a parison mold bottom plate 26.

The distribution of the glass in the bottom portion of the resultant hollow or counterblown parison 23, Fig. 6, will be such that the hollow parison is well adapted for further expansion in a final blow mold to the article of the final shape desired.

After the formation of the counterblown parison 23 in the parison mold 11, which may be effected either before or after the reversion of the parison mold, such parison may be transferred in any suitable known way and by any suitable known means to an appropriate final blow mold 24 and blown therein to produce an article 25, Figs. 8 and 9, of the final shape desired.

The invention may be employed to advantage in the manufacture of feeder-fed charges into bottles or like articles of rectangular, elliptical, oval, or other generally similar shape in cross-section. For convenience of expression, the word "oblong" is used in the appended claims as generic to all of such shapes. The details of apparatus for and methods of carrying out the invention may be varied according to different service requirements at different times and according to specific differences in the shapes of the articles to be produced at different times.

I claim:

1. Apparatus for producing a glass parison comprising an inverted parison mold adapted to receive a charge of molten glass of insufficient mass completely to fill the cavity of said mold, a plunger movable from a position above the mold downwardly into the glass in the mold axially of the mold cavity, the portion of the plunger immersed in the glass during the downward movement of the plunger and the adjacent portions of the mold cavity being of sizes and shapes predetermined with relation to one another so that the plunger is spaced from the walls of the mold cavity at all places around the plunger by a space that is of different widths at different places around the plunger.

2. Apparatus for producing a parison for a bottle or like glass article having a body of generally oblong shape in cross sectional configuration, comprising an inverted parison mold having a cavity of oblong shape in cross section adjacent to its upper end, said cavity being adapted to receive a charge of molten glass, and a plunger movable from above downwardly into the glass in the mold cavity axially of said cavity to displace glass of the charge upwardly between the plunger and the walls of a previously unfilled portion of the mold cavity, the portion of said plunger immersed in the glass during its downward movement being of generally oblong shape in cross sectional configuration and having transverse major and minor dimensions selected with relation to the major and minor transverse dimensions of the mold cavity so that the space for upward displacement of glass between the plunger and the walls of the mold cavity is wider between the wider portions of the plunger and mold cavity than between the narrower portions of the plunger and mold cavity.

3. The method of producing a parison for a bottle or like article which comprises the steps of receiving a charge of molten glass in the cavity of an inverted parison mold, causing upward displacement of glass of the charge along the walls of a previously unfilled portion of the mold cavity to different levels at different places around the wall of the mold cavity while at the same time producing a depression within the confines of the upwardly displaced glass in the mold, and counterblowing the glass in the mold cavity to effect obliteration of the depression within the upwardly displaced glass and to produce a counterblown hollow parison that is adapted for further expansion into the article desired.

4. The method of producing a parison for a bottle or like glass article having a body of generally oblong shape in cross sectional configuration, which comprises the steps of receiving a charge of molten glass in an inverted mold having a glass receiving cavity of generally oblong shape in cross sectional configuration, causing upward displacement of glass of the charge along walls of a previously unfilled portion of the inverted mold cavity to a higher level at the ends of said generally oblong cross section of the mold cavity than at the sides thereof while at the same time producing a depression within the confines of the upwardly displaced glass, and counterblowing the glass in the mold to obliterate the depression within the confines of the upwardly displaced glass and to expand the glass in the mold internally against a baffle at the bottom end of the parison mold.

GEORGE E. ROWE.